United States Patent
Yih

[11] 4,036,550
[45] July 19, 1977

[54] LIQUID CRYSTAL DISPLAY

[75] Inventor: James Shou-Chen Yih, Sunnyvale, Calif.

[73] Assignee: Intel Corporation, Santa Clara, Calif.

[21] Appl. No.: 599,593

[22] Filed: July 28, 1975

Related U.S. Application Data

[63] Continuation of Ser. No. 388,832, Aug. 16, 1973, abandoned.

[51] Int. Cl.² .................................................. G02F 1/13
[52] U.S. Cl. .............................................. 350/160 LC
[58] Field of Search ................................... 350/160 LC

[56] References Cited

U.S. PATENT DOCUMENTS

| | | | |
|---|---|---|---|
| 3,647,280 | 3/1972 | Klein ................................ | 350/160 LC |
| 3,700,306 | 10/1972 | Cartmell et al. ........... | 350/160 LC X |
| 3,814,501 | 6/1974 | Schindler ...................... | 350/160 LC |

Primary Examiner—John K. Corbin
Assistant Examiner—Rolf Hille
Attorney, Agent, or Firm—Spensley, Horn, Jubas & Lubitz

[57] ABSTRACT

The present invention is a liquid crystal display which has liquid crystal disposed between a pair of substrates. A first substrate has a transparent electrical conductive coated surface, including a plurality of indicia members which enable indicia to be formed by the display. A second substrate has one surface with a reflective coating thereon that covers a substantial portion of the surface of said substrate which forms the observed part of the display. In one form of the invention the reflective coating is etched to form a plurality of electrically isolated areas and an electrically conductive path. When a selected electrical potential is applied between selected indicia members and indicia pads, predetermined indicia are illuminated while the remaining indicia members and electrical leads remain transparent.

8 Claims, 14 Drawing Figures

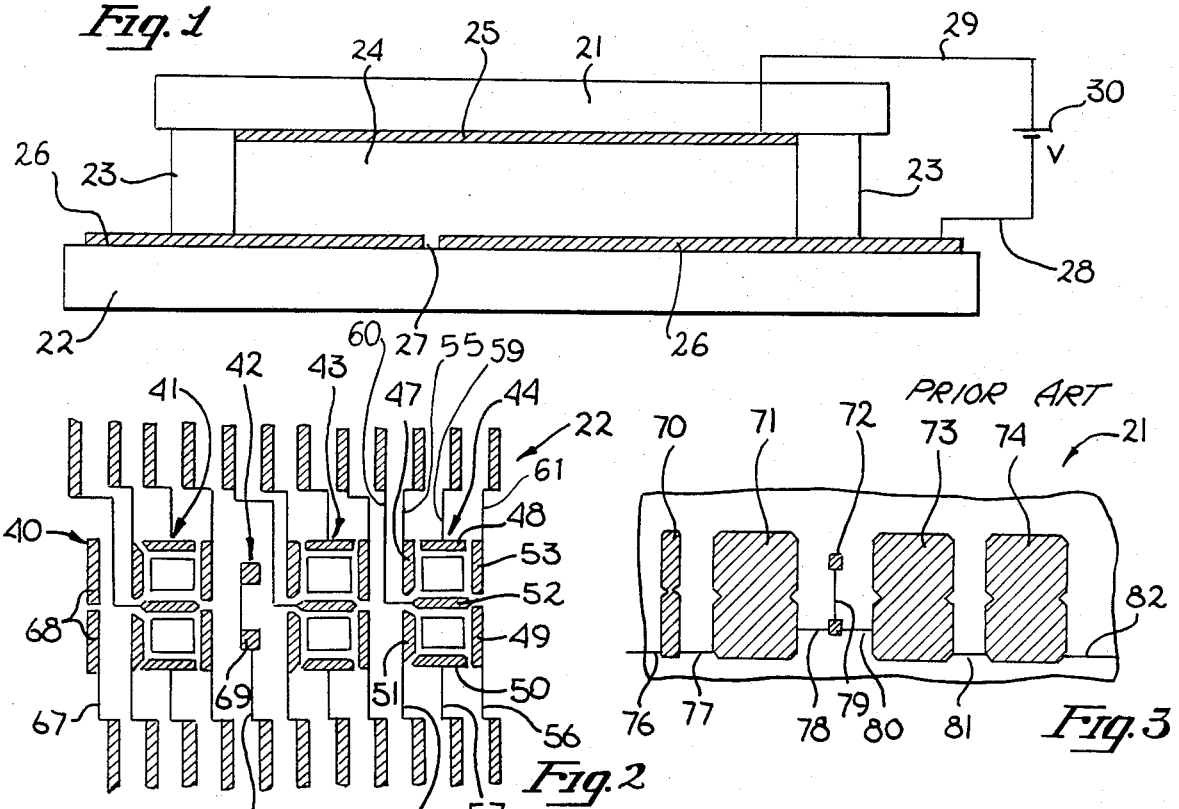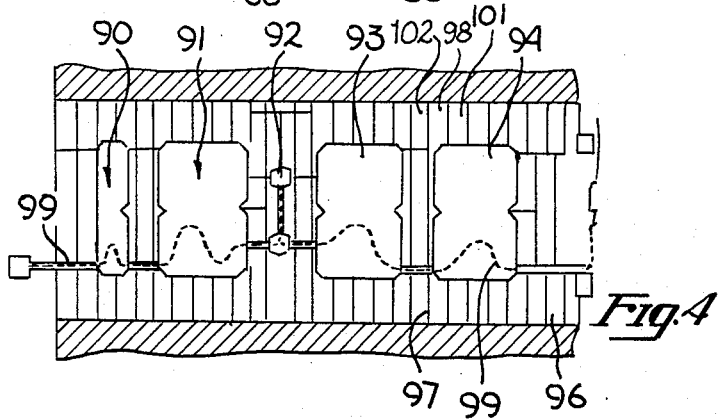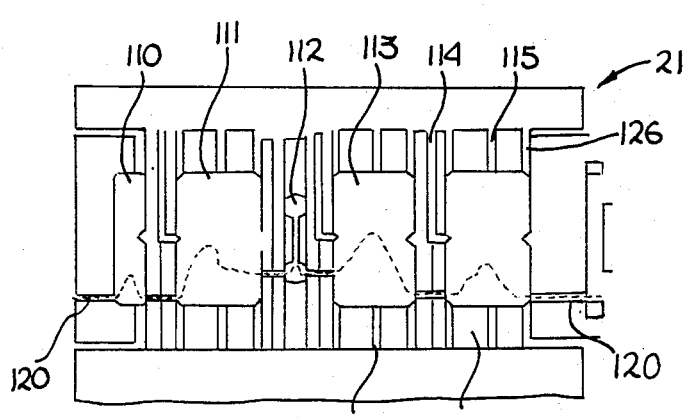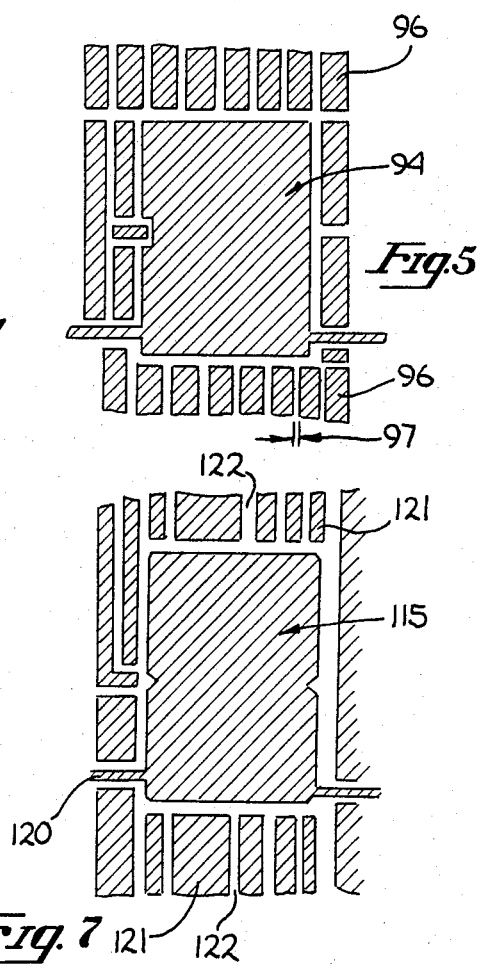

LIQUID CRYSTAL DISPLAY

This is a continuation of application Ser. No. 388,832, filed Aug. 16, 1973, now abandoned.

BACKGROUND OF THE INVENTION

1. Field of the Invention

This invention relates to a liquid crystal display.

2. Prior Art

Most liquid crystal devices are comprised of two spaced parallel substrates with liquid crystal between the substrates. Electrical conductors for the application of a selected voltage are formed on internal facing sides of the substrates. When a voltage is applied to the liquid crystal via the electrical conductors, the liquid crystal changes from a first state to a second state. Typically, in the first state, the liquid crystal is transparent, while in the second state it forms a light altering (e.g. scattering) surface at the point of voltage application.

By placing formed electrodes in certain desired locations specific images coinciding with the formed electrode can be selectively made to appear in the liquid crystal. For example, one form of the liquid crystal display unit employs front and rear transparent substrates, and is viewed from the front substrate. The front and rear substrates and front electrodes are transparent, while the rear electrode may be reflective or transparent. In addition, the rear substrate may employ an additional layer or coating to achieve certain desired optical effects. When the device is used, light is directed into the front side of the display and the electrodes are energized. Various parts of the liquid crystal become light scattering and the effect is to view scattering portions on a mirror-like background. There are, of course, other forms of liquid crystal display which do not employ the same physical effect but which may employ the invention described herein.

The operation and construction of liquid crystal display devices, such as described above, is well known in the prior art. Two examples of such prior art are U.S. Pat. No. 3,322,485 and U.S. Pat. No. 3,612,654.

There have been numerous problems in prior art liquid crystal display devices regarding the cosmetic appearance of the display devices. Haze formation within the liquid crystal is one such problem. Nematic liquid crystal has a particular molecular alignment when it comes in contact with any type surface. The molecular alignments tend to be different for each type of surface the liquid crystal is contacting. In the prior art the liquid crystal often contacted four or more different types of surfaces and this forced the liquid crystal to take as many different molecular alignments as surfaces it engaged. (The different molecular alignments cause the usual effect of a haze in the liquid crystal package.) The present invention tends to solve these problems by reducing to a minimum the number of different surfaces which the liquid crystal must contact.

Another problem in the prior art arises from the fragmented or pad like configuration of the back reflector. This configuration has resulted in the energized segment having one contrast to certain portions of the segment and another contrast as to other portions of the segments. This results in poor overall contrast. This is true regardless of the fact that a layer of material is employed on the side of the substrate opposed to that where the pads are formed. This problem is solved by the present invention by creating the appearance of a solid back reflector. A further benefit is that the unpowered segments are made less visible because there is no adjacent "bare" glass to provide optical contrast.

A primary characteristic of the liquid crystal display devices is that both substrates are required to be perfectly aligned both in the horizontal and vertical plane. The present invention reduces the necessity of perfect substrate alignment. The present invention embodies a structure which will allow mechanical alignment assembly techniques and result in substantial savings to manufacturers.

Another problem in the prior art occurs when direct current is applied to the liquid crystal display. The direct current tends to contaminate the liquid crystal, thereby lowering the useful life of the display. This problem in the present invention is solved by applying a dielectric coating to the conductive surface on each substrate which screens off any residual direct current which may be applied to the display. This dielectric coating or layer benefits the cosmetic appearance because it reduces the number of different surfaces the liquid crystal must contact. Thus, the possibility of haze formation is reduced even further.

SUMMARY OF THE INVENTION

A liquid crystal display having a first substrate and a second substrate is disclosed. The first substrate has a transparent conductive coated surface which is etched so as to form electrical conductive indicia members. The second substrate is reflective or has a reflective coating on one surface that covers at least a substantial portion of the substrate which forms the observed part of the display. In one form of the invention the reflective coating is etched so as to form electrically isolated areas and an electrically conductive path including indicia pads. When the second substrate is disposed over the first substrate and the electrical leads to the indicia members are aligned with the electrically isolated areas of the second substrate no lead will be illuminated since no electrical potential difference may form and the liquid crystal will not be altered in the vicinity of the leads. When the conductive indicia members on the first substrate are aligned with the indicia pads on the second substrate a potential difference may be created which makes the liquid crystal light scattering thereby illuminating the indicia which are electrically charged.

A dielectric material may be disposed on both the metallic reflective surface and the transparent conductive surface so as to reduce the number of surfaces the liquid crystal must contact, and to screen off any direct current from operating the liquid crystal display.

The present invention makes liquid crystal displays more cosmetically pleasing because it eliminates the fragmented reflective surface, eliminates illumination of the electrical leads while reducing the haze formation and improves definition. In addition, the surprising result of wider viewing angles is achieved. In addition, the dielectric layer increases the life of the liquid crystal display by screening any residual direct current.

BRIEF DESCRIPTION OF THE DRAWINGS

FIG. 1 is a cross-sectional view of the presently preferred embodiment of the liquid crystal display;

FIG. 2 is a view of the transparent conductor disposed on the front substrate of the presently preferred embodiment;

FIG. 3 shows the reflective conductor as disposed on the rear substrate in the prior art;

FIG. 4 shows the reflective surface of the first substrate etched to form the indicia pads and electrically isolated areas of the presently preferred embodiment;

FIG. 5 is digit 94 blown up to illustrate the indicia pads and electrical floating areas;

FIG. 6 shows the reflective surface of the first substrate etched to form the indicia pads and electrically isolated areas of the first alternative embodiment, FIG. 7 is digit 115 blown up to illustrate the indicia pads and electrical floating areas;

DETAILED DESCRIPTION OF THE INVENTION

Figure 8:
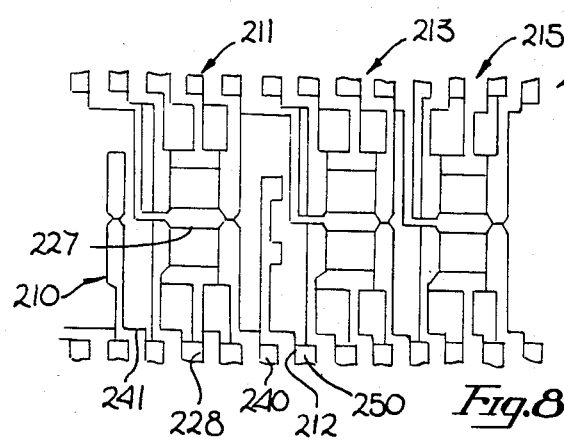
FIG. 8 shows the conductive surface of the second substrate etched so as to form the indicia members of the first alternative embodiment.

The liquid crystal display is comprised of a liquid crystal substance contained between coplanar substrates which are capable of applying a voltage across the liquid crystal at specific predetermined points. The present invention deals with methods for improving the structure of the liquid crystal display so as to improve their cosmetic appearance, extend their useful life and facilitate ease of manufacturing. The liquid crystal display operates on a very low power source and can be used economically and efficiently in various operations such as in electrical calculating units, computer panel displays, numeric readouts, flat screen television, score boards for athletic events and for many other purposes. However, in the presently preferred embodiment and as described hereinafter the liquid crystal display will provide the numerical readout for a wrist watch. It should be noted that the presently preferred embodiment utilizes the liquid crystal display for displaying time on a wrist watch, however, the invention is not so restricted and this utilization is used for illustration purposes only.

In FIG. 1, a cross-section of a liquid crystal display is shown. The display has several basic parts, including: a "front" or first substrate 22 which is transparent, a "rear" or second substrate 21 which is reflective a spacer 23 which maintains the parallelism of the substrate, liquid crystal 24 which is disposed between the substrates, and a power source 30 having leads 28 and 29 which can apply a potential difference between the two substrates at predetermined points. The first substrate 22 has one surface with a transparent conductor 26 thereon, which in the presently preferred embodiment is a layer of indium oxide. The indium oxide layer 26 is etched to form indicia members. The second substrate 21 has one surface which contains a reflective conductive surface 25, which in the presently preferred embodiment is gold. This surface is etched to provide a conductive path 99 and electrically isolated floating areas 96 (see FIGS. 4 and 5).

In the presently preferred embodiment the layer 26 on the first substrate 22 is best shown in FIG. 2 and the reflective surface 25 on the second substrate 21 is best shown in FIG. 4. The first substrate 22 which is transparent is normally made from glass of the type commonly used in the trade which should be dimensionally stable. One side of the first substrate is coated with an electrically conductive material 26 (e.g. indium oxide) which is transparent. The electrically conductive material is disposed upon the substrate 22 by chemical coating, evaporation spraying or other methods well known in the art. The conductive material 26 is then etched to form the indicia members and to enable these members to be conductively connected to a voltage source. The indicia members in the particular embodiment are comprised of four digits 40, 41, 43 and 44, and separating mark 42 (e.g. colon). It is of course, within the scope of this invention to employ indicia which do not comprise alpha-numeric symbols but only comprise marks, dots, or symbols. The left leading digit 40 is formed by conductive area 68 which is connected to the power source by lead 67. Separating mark 42 is composed of two conductive areas 69 connected to the voltage source by lead 66. The remaining three display indicia are each comprised of seven conductive areas. These seven conductive areas are arranged such that when various combinations are selectively energized all of the numerals zero through nine can be formed. This arrangement as shown in digit 44, consists of three horizontal parallel conductive areas, a top area 48, a middle area 52 and a bottom area 50. The four vertical conductive areas are disposed perpendicular to the three horizontal conductive areas such as to form two squares, one disposed on top of the other such that the middle area 52 forms a side of both squares and is common to each square. The vertical conductive areas 51 and 47 form the left hand side of the squares while areas 49 and 53 form right hand vertical sides of the squares. Each conductive area is independently coupled to the power source by a specific lead; area 53 by lead 55; area 48 by lead 61; area 47 by lead 60; area 51 by lead 58; area 50 by lead 57; area 49 by lead 56; and area 52 by lead 59. It should be noted that the two remaining digits are formed with the same seven segmented conductive areas as digit 44. Each segment on the remaining two digits is independently electrically coupled to a power source in order that any given area or areas may be energized in any one digit. It is within the scope of the invention to employ multiplex techniques and interconnect various areas to minimize individually formed connections to the power source (See Figure 5)

The second substrate 21 shown in FIG. 4, is employed in the presently preferred embodiment. The substrate 21 is normally made of glass. However, in the present invention any substrate which is compatible with the liquid crystal and which is reflective and separable into conductive and electrically isolated areas may be utilized. It should be understood that in one form of the invention the substrate itself may be reflective and no coating is required. In the preferred form a reflective coating is placed on a substrate. This reflective coating in one form of the invention is not further formed, that is, etched, but in said embodiment the leads to the digit segments on substrate 22 would appear lighted. To minimize this effect, the leads would be made as narrow as feasible. In the form of the invention shown in FIG. 4 the reflective coating is separable into conductive and electrically isolated areas.

In the preferred form the substrate 21 has a conductive reflective coating or layer 25 thereon. This layer 25 is chemically coated, evaporated or disposed upon the substrate 21 by methods well known in the art. The layer 25 may be made from any reflective conductive material and in the presently preferred embodiment is made from gold. The reflectivity may result from the character of material, the thickness of the material, the interface character or other means for creating reflectivity. The conductivity similarly may be due to the material, an additive thereto or other means of facilitating conductance. The layer 25 is etched to form the conductive path 99, a plurality of area of indicia pads, 90, 91, 92, 93, 94 and electrically floating or insulated areas 96 separated therefrom by etched regions in the form of line like regions having a typical width of 0.001 inches. (Throughout the remainder of this application an electrically floating area shall mean an area which is not directly connected to a source of potential or which does not receive an electrical signal via any electrical connection, see FIG. 5.)

The substrate 21 has formed thereon indicia pads 90, 91, 93 and 94 and indicia mark 92. The left leading indicia pad 90 is narrow and rectangular with a width equal to the width of conductive area 68 of left leading digit 40 on the substrate 22. The remaining indicia pads are generally rectangular in shape and have a width approximately equal to the width of the digit 44 on the substrate 22, and a length approximately equal to the length of the display digit 44 of the substrate 22. The separating mark 92 is formed in the same shape as the separating mark 42 on the substrate 22.

It should be understood that it is only necessary for the indicia pads to be in overlying and in part overlapping relationship to the digits (e.g. indicia members) on substrate 22 and equality of dimension or shape is not required for operation of the display. A plurality of electrically floating areas 96 are created by the removal of portions of layer 25, such as by vertically etching stripes 97 uniformly across the layer 25 and best shown in FIG. 5. These stripes 97, however, do not extend across indicia pads 90, 91, 93 and 94, the separating mark 92 or conductive path 99. The conductive path 99 which electrically couples each of the indicia pads 90, 91, 93, 94 and the indicia mark 92 also may be formed by etching. Typically, the etched vertical stripes 97 are of a one mil width and extend to the surface of the substrate which is an electrically insulative material. The stripe surrounds the pads and conductive path so that the remaining portions of layer 25 are electrically separated therefrom but yet said surface of substrate 21 is substantially covered by layer 25.

Prior art liquid crystal displays utilized a display substrate 22 with a transparent conductor 26 similar to that employed in the presently preferred embodiment (see FIG. 2). However, the reflective layer 25 of substrate 21 was formed as is shown by the sectional lines in FIG. 3. The layer 25 was almost entirely etched away leaving only the indicia pads 70, 71, 73, 74, the separating mark 72 and the electrical conductive leads 76, 77, 78, 79, 80, 81 and 82. This type of fabrication resulted in many problems which have previously been discussed.

Assembly of the presently preferred embodiment is accomplished by disposing the substrate 21 over the substrate 22, as shown in FIG. 1. It is important that when these substrates are secured in place they be aligned. When assembled the transparent conductive lead 60 (see FIG. 2) will be aligned directly over the electrically floating area 98 (see FIG. 4). Thus, whenever a voltage is applied to conductive lead 60 the electrically floating area 98 will substantially follow the potential on lead 60 and hence the required electrical field to operate the liquid crystal material will not occur between lead 60 and area 98. Hence lead 60 will not appear illuminated. If the two substrates are properly aligned each electrical lead to each conductive area 96 on the transparent substrate 22 will be disposed directly over an electrically floating area 98 and will not cross any of the etched lines 97. Also when properly aligned the indicia pads 90, 91, 93 and 94 on substrate 21 will be disposed respectively in alignment with the digits 40, 41, 43, and 44 on the substrate 22 as will be the marks 42 and 92. Thus, when a potential is applied to any of the individual indicia members of the substrate 22 a selected potential is applied across the liquid crystal via the related indicia pads.

The first alternative embodiment extends the planar concept of the layer 25 in the embodiment as shown in FIG. 4 to both the layer 25 and the transparent layer 26. (see FIGS. 6 and 8) (Planar concept is a term which describes how the transparent layer 26 is formed on the substrate 21, compare FIG. 2 and FIG. 8) The layer 25 of this embodiment is formed in the same manner as the layer 25 of the embodiment shown in FIG. 4. One difference lies in the fact that the vertical etchings 122 of this alternative embodiment create the floating electrical areas 121 in different patterns than in the embodiment of FIG. 4. These electrical floating areas 121 are disposed on the substrate 21 so as to be aligned with the electrical leads and indicia members of the substrate 22 and best shown in FIG. 7. The indicia pads 110, 111, 113, and 115 and the indicia mark 112, are similar to the pads and mark shown in FIG. 4. The conductive path 120 is similar to conductive path 99 of the previous embodiment.

The transparent layer 26 of the substrate 22, shown in FIG. 8 is significantly different than the presently preferred embodiment. Here instead of removing all of the transparent conductive material (e.g. indium oxide, tin oxide, etc.), around the leads and indicia to form the pattern shown in FIG. 2, only fine separating stripes are etched to electrically isolate the indicia members and leads from the surrounding electrically floating areas 250 (see FIGS. 8 and 9).

Figure 9:
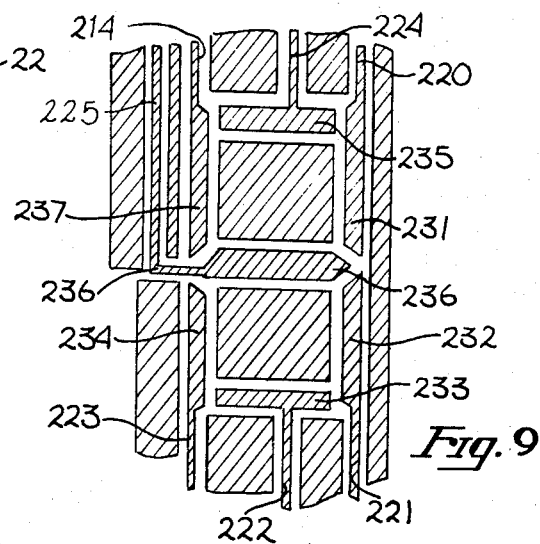
FIG. 9 is digit 215 blown up to illustrate the conductive indicia members and electrical leads.

In this embodiment four display digits 210, 211, 213 and 215 and separating mark 212 are formed by joining electrical leads, and etching stripes best shown in FIG. 9. The display digit 210 which is at the extreme left side and used to display the numeral 1 is formed from one electrical lead 241 and the etched stripes. The remaining display digits are created by etchings which dielectrically isolate seven conductive indicia members from the remaining portions or transparent layer 26 which remain on substrate 22. Each of the seven indicia members in a digit are independently electrically coupled to the source by leads 220, 221, 222, 223, 214, 225 and 224 (see digit 215). These leads are extended to create the indicia members 231, 232, 233, 234, 237, 236 and 235. The digit 215 is formed from seven segments much the same as digit 44 described above. The separating mark 212 is formed as an extension of electrical lead 240.

The first substrate 21 (see FIG. 6) and the second substrate 22 (see FIG. 8) are disposed in relation to each other such that all transparent leads are in alignment with electrically floating areas. The indicia members on the substrate 22 are also in alignment with the indicia pads on the substrate 21. For example, electrical lead 220 on the substrate 22 is in alignment with the electrically floating area 126 on the substrate 21. Also the indicia members forming digit 215 on the substrate 22 are in alignment with indicia pad 115 on the substrate 21.

It should be noted that on the substrate 22 the conductive areas, such as area 231 is different in shape than conductive area 53 of the first embodiment. Area 231 is larger than is required to display the upper vertical conductive area of digit 215. However, on the substrate where lead 220 and conductive area 231 align with electrically isolated area 126 no charge or potential difference can be formed between the substrates and hence the liquid crystal can not be energized. If misalignment occurs it will show up in the display because the floating area 126 is not located under the entire portion of area 231 and hence a potential difference may occur at undesirable locations.

Figure 10:
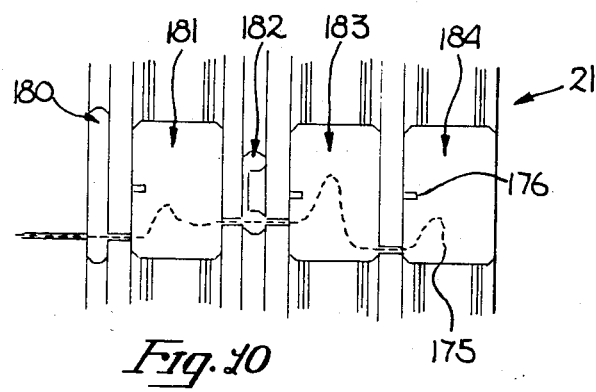
FIG. 10 shows the reflective surface of the first substrate etched so as to form the indicia pads and electrically isolated areas of the second alternative embodiment.
Figure 11:
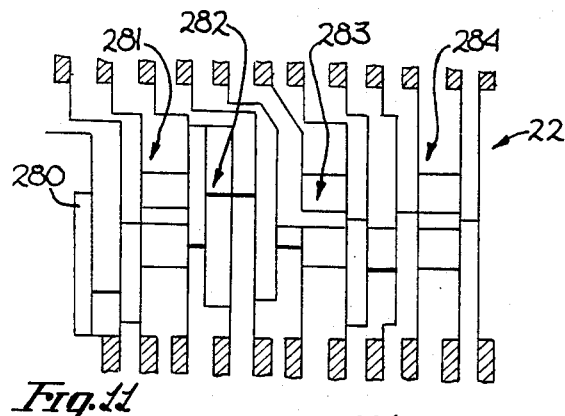
FIG. 11 shows the conductive surface of the second substrate etched so as to form the indicia members of the second alternative embodiment.
Figure 12:
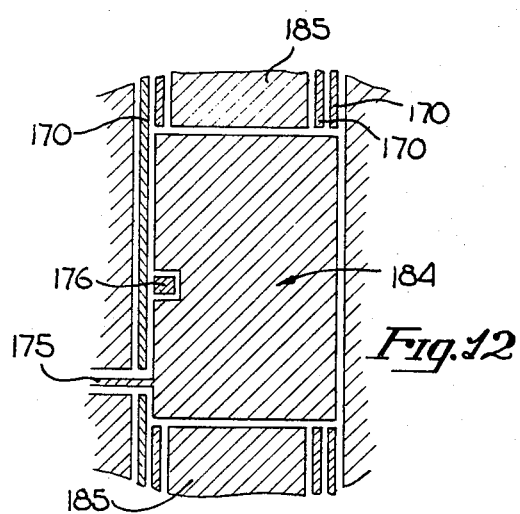
FIG. 12 is digit 184 blown up to illustrate the indicia pads and electrical floating areas.

Another alternative embodiment is shown in FIG. 10 and 11. FIG. 10 illustrates the layer 25 of the substrate 21 and FIG. 11 illustrates the indicia members and electrically isolated areas on the substrate 22. This alternative embodiment solves some of the problems encountered in alignment of the two substrates in the horizontal plane. The indicia pads formed are similar to that shown in FIG. 4. It has pads 180, 181, 183 and 184 and mark 182. The conductive path 175 is similar to conductive path 99 in the previous embodiment. One difference is that the electrical floating areas 185 and 170 are of a different pattern than those employed in the first alternative embodiment compare FIG. 12 and FIG. 5. Another difference is that the conductive areas which form the indicia pads are slightly larger in both width and height than the pads 94 of the alternative embodiment of FIG. 4. This enlargement serves to allow slight variations in alignment of the indicia members on substrate 22 in relation to the indicia pads on the substrate. It is permissible because of the increased area on the substrate 21 over which the indicia members of the substrate 22 may be disposed and still have a conductive area in alignment.

Figure 13:
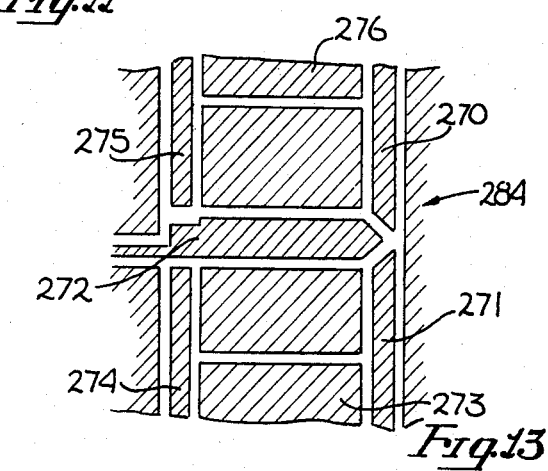
FIG. 13 is digit 284 blown up to illustrate the conductive indicia members and electrical leads.

The embodiment of FIGS. 10 and 11 employ the double planar concept. The indicia members are different in this embodiment in that certain of the indicia are in the form of oversized rectangular like members. These members may also be referred to for purposes of this invention as indicia members notwithstanding they are substantially different from the other indicia members. The four digits are 280, 281, 283, and 284 and mark 282. This embodiment also employs seven conductive areas which selectively and independently activate so as to form each of the numerals zero through nine, best shown in FIG. 13. The seven areas 270, 271, 273, 274, 272 and 275 and 276 are larger than needed to form the digit (FIG. 11). In fact if the total conductive area was displayed no numerals could be formed. However, when the two substrates are disposed in position the electrically floating areas 185 on the substrate 21 prevent a major portion of the conductive areas on substrate 22 from being effective. Thus, the indicia configuration of this embodiment is created by overlapping and overlying cooperation of the pads and the conductive areas as distinguished from the shape of the conductive areas. In this embodiment if north or south horizontal misalignment occurs only width variations in the display digits may occur, and these are less visible than the misalignment patterns created in the other embodiments. If east or west horizontal misalignment occurs it will not affect the display. Since the widths of the four vertical conductive areas do not vary and since the pads on the substrate 21 are slightly wider than the vertical conductive areas on the substrate 22 no display misalignments will appear.

This type of layout may lead to mechanical alignment assembly techniques resulting in labor savings. It will also offer immediate advantages in that many misalignment problems are minimized.

Figure 14:
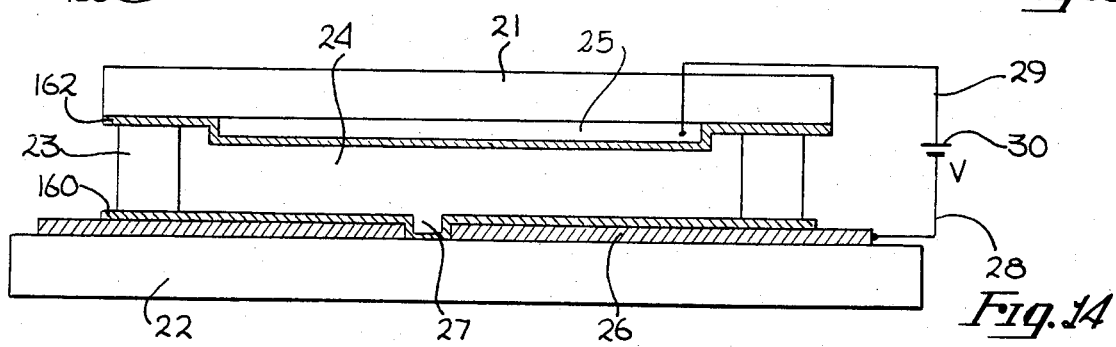
FIG. 14 is a cross-sectional view of the third alternative embodiment of the display utilizing a dielectric layer on both the conductive surface of the first substrate and the reflective surface of the second substrate.

Another alternative embodiment is shown in FIG. 14. This embodiment is substantially the same as that shown in FIG. 1 with the main exception that layer 25 and layer 26 are coated with a thin dielectric material 162 and 160 such as $SiO_2$. This dielectric 160 and 162 is thermally decomposed or vacuum evaporated onto the metallic layer 25 and substrate 21 prior to assembly. The substrate 22 is similar to that employed in the embodiment heretofore described with the main exception that the formed transparent conductive layer (e.g. indium oxide) also has a thin layer of dielectric material 160 decomposed or vacuum evaporated onto it. Power is supplied to the display by voltage source 30 through leads 28 and 29.

The difference in this embodiment is that a dielectric material has been placed over both the formed layers 25 and 26. This dielectric material serves several important functions. For example, the dielectric surface reduces the number of surfaces the liquid crystal must come in contact with from two to one. Thus, better molecular alignment is achieved and haze formation is reduced. The other benefit is that the dielectric layers effectively screen off any residual direct current from the display. This is important because direct current causes contamination in the liquid crystal and considerably shortens the effective life of the display.

It should be noted that the alternative embodiment of FIG. 9 can be employed on any of the prior embodiments. The only difference being the added dielectric surface. This surface can be applied to any of the prior embodiments without altering the electrical isolation of the floating areas.

It should also be noted that the surfaces 25 and 26 described in this invention have been described as being deposited by thermal decomposition or vacuum evaporation. The floating areas, indicia members, indicia leads, indicia pads, electrical leads and conductive paths have been described as being formed by etching, however, lifting could equally as well be employed.

I claim:

1. In a liquid crystal display which includes a first and second substrate disposed in a substantially parallel configuration and having a liquid crystal material disposed therebetween, said second substrate having conductive transparent indicia members thereon and a plurality of electrical leads selectively coupled to said indicia members, an improvement comprising:

a substantially reflective and conductive surface on said first substrate in underlying relationship to said indicia members, said reflective and conductive surface covering a substantial part of said first substrate and said surface on said first substrate being configured and arranged into a plurality of non-energized areas without direct electrical connection thereto, energized areas having electrical connections thereto, and a nonconductive and nonreflective isolation area between each of said non-energized areas and each of said energized areas, at least one of said non-energized areas being aligned with respect to each of said electrical leads so as to completely underlie said one electrical lead, one of said energized areas being aligned with respect to at least one of said indicia members so as to underlie said one indicia member, each of said electrical leads overlies said isolation area and at least one of said non-energized areas to display said indicia members without displaying said electrical leads and said isolation area.

2. A liquid crystal display comprising:

a first substrate having an inner and outer surface with a substantial portion of its inner surface covered with a conductive reflective layer, said substrate being electrically insulative and said layer having a plurality of stripes removed therefrom, said stripes thereon in the order of one mil in width and being configured to form said conductive reflective layer into a plurality of indicia pads which are adapted to be connected to an electrical potential and a plurality of areas without any electrical connection thereto, said conductive reflective layer but for said stripes presenting a continuous reflective surface on said first substrate;

a second substrate having a conductive layer thereon formed into a plurality of indicia electrodes, each indicia electrode having a lead portion, said plurality of indicia electrodes located in cooperating relationship with said indicia pads on said first substrate, energization of said indicia pads and said indicia electrodes resulting in the formation of a visible indicia member without causing said lead portion of said indicia electrode or stripes to become visible, said visible indicia members being defined by a portion of said indicia electrode;

spacing means for spacing said first substrate from said second substrate, said spacing means and said substrates defining a cavity; and liquid crystal material disposed in said cavity whereby said first substrate is disposed in an overlying relationship with respect to said second substrate such that an electrical potential can be applied between said substrates.

3. The structure defined in claim 2 wherein a plurality of said stripes are substantially perpendicular to and spaced along at least two boundaries of said indicia pads, each of said lead portions of said electrodes on said substrate are opposed to one of said plurality of areas without electrical connection thereto in said substrate.

4. The structure of claim 2 wherein:

said conductive layer of said second substrate is formed into a plurality of said indicia electrodes and a plurality of non-energized areas having no connection thereto, said indicia electrodes and non-energized areas being electrically and physically separated from each other by a non-conductive region being generally in the form of joined line segments; and said plurality of said stripes on said first substrate are selectively spaced by varying distances along and are substantially perpendicular to at least two boundaries of said indicia pads.

5. A liquid crystal display comprising:

a first substrate having an inner and outer surface with a substantial portion of its inner surface covered with a conductive reflective layer, said substrate being electrically insulative and said layer having a first plurality of stripes removed therefrom, said stripes thereon in the order of one mil in width and being configured to form said conductive layer into a plurality of indicia pads being connected to an electrical potential and a plurality of non-energized areas having no electrical connection thereto, said conductive reflective layer substantially presenting a continuous reflective surface on said substrate;

a second substrate having an inner and outer surface with a substantial portion of its inner surface covered with a conductive layer having a second plurality of stripes removed therefrom, said stripes being of the order of one mil in width and being configured to form said conductive layer into a plurality of indicia electrodes and a plurality of non-energized areas having no electrical connection thereto, said plurality of indicia electrodes forming at least one digit, each indicia electrode having a lead portion, said digit formed by said indicia electrodes being disposed in an overlying relationship with one of said plurality of indicia pads so that energization of said indicia pads and said indicia electrodes forming said digit results in the display of a visible digit member formed by a portion of said indicia electrodes without displaying said lead portion of said indicia electrodes and without displaying said stripes, said digit formed by said indicia electrodes being larger than said opposed indicia pad such that misalignments between said indicia electrodes and said indicia pads fail to cause saiid lead portions of said indicia electrodes to be displayed and fail to substantially destroy the readability of said visible digit member;

spacing means for spacing said first substrate from said second substrate, said spacing means and said substrates defining a cavity, so that said first substrate is disposed in an overlying relationship with respect to said second substrate to allow an electric potential to be applied between said substrates; and liquid crystal disposed in said cavity.

6. The liquid crystal display of claim 5 wherein: said digit formed by said indicia electrodes is configured by said second plurality of stripes into a seven segmented digit having four vertical electrodes and three horizontal electrodes configured in the form of a block eight having two non-energized areas circumscribed by said electrodes, said electrodes having sufficient width and breath to extend substantially beyond the horizontal and vertical boundaries of said opposed indicia pad, and said electrodes extending substantially unaltered in shape to one boundary of said conductive layer to form said lead portion contiguous to said boundary, said electrodes thereby remaining in an overlying and opposed position with respect to said indicia pad despite vertical and horizontal misalignments so that said misalignments fail to cause said lead portions to be displayed and fail to destroy the readability of said visible digit member.

7. A liquid crystal display for forming a character image including an upper and lower substrate and a liquid crystal substance disposed between said upper and lower substrates, each substrate having a conductive layer disposed thereon and configured into a plurality of electrically separated areas, said conductive layer having at least one said area fixed at a first potential for each character image, each said area forming an indicia pad, said conductive layer on said upper substrate having more than one of said areas selectively coupled to a second potential to form a plurality of indicia electrodes collectively forming an indicia electrode pattern for each character image, said liquid crystal substance changing state when disposed between an indicia pad at said first potential and an indicia electrode at said second potential, the improvement comprising:

a configuration of said indicia electrodes and indicia pad for each character image wherein said character image is formed by partial overlap of said indicia electrode pattern with said indicia pad, said indicia electrode pattern overlapping and extending beyond said indicia pad so that displacements of said indicia electrode pattern with respect to said indicia pad do not tend to destroy said partial overlap and formation of said character image.

8. The improvement of claim 7 wherein each said indicia pad has a generally rectangular shape, and said indicia electrode pattern is a seven segmented alphanumeric pattern having two end indicia electrodes, four side indicia electrodes and one midsection indicia electrode, wherein said end and side electrodes enclose an area smaller than the area of said indicia pad and each said end and side electrode overlaps and extends beyond said indicia pad despite misalignments of said indicia electrode pattern with respect to said indicia pad.

* * * * *